(12) United States Patent
Senda

(10) Patent No.: US 7,760,387 B2
(45) Date of Patent: Jul. 20, 2010

(54) IMAGE FORMING DEVICE, HARDWARE CONTROL METHOD, AND HARDWARE CONTROL PROGRAM

(75) Inventor: Shigeya Senda, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 1319 days.

(21) Appl. No.: 11/234,240

(22) Filed: Sep. 26, 2005

(65) Prior Publication Data

US 2006/0070045 A1 Mar. 30, 2006

(30) Foreign Application Priority Data

Sep. 28, 2004 (JP) ............... 2004-282049
Sep. 7, 2005 (JP) ............... 2005-259433

(51) Int. Cl.
G06F 9/45 (2006.01)
(52) U.S. Cl. .................. 358/1.17; 358/1.16; 717/136
(58) Field of Classification Search ............... 358/1.16, 358/1.17; 345/537, 541, 543, 544; 717/136
See application file for complete search history.

(56) References Cited

U.S. PATENT DOCUMENTS

| | | | | |
|---|---|---|---|---|
| 5,900,025 | A * | 5/1999 | Sollars | 712/248 |
| 6,282,388 | B1 | 8/2001 | Obata | |
| 6,760,784 | B1 * | 7/2004 | Bodin et al. | 719/323 |
| 7,515,293 | B2 * | 4/2009 | Kizaki et al. | 358/1.16 |
| 2003/0044092 | A1 * | 3/2003 | Tanaka | 382/325 |
| 2003/0072023 | A1 | 4/2003 | Tanaka | |
| 2004/0109186 | A1 * | 6/2004 | Shindoh et al. | 358/1.13 |
| 2004/0190074 | A1 * | 9/2004 | Kato | 358/400 |
| 2006/0070045 | A1 | 3/2006 | Senda | |

FOREIGN PATENT DOCUMENTS

| | | |
|---|---|---|
| EP | 0 052 713 A2 | 6/1982 |
| JP | 2003-162419 | 6/2003 |
| JP | 2003-177931 | 6/2003 |
| JP | 2003298793 A * | 10/2003 |
| JP | 2004-287838 | 10/2004 |

OTHER PUBLICATIONS

U.S. Appl. No. 12/274,519, filed Nov. 20, 2008, Senda.
U.S. Appl. No. 11/663,955, filed Mar. 28, 2007, Senda.

* cited by examiner

*Primary Examiner*—King Y Poon
*Assistant Examiner*—Allen H Nguyen
(74) *Attorney, Agent, or Firm*—Oblon, Spivak, McClelland, Maier & Neustadt, L.L.P.

(57) ABSTRACT

In an image forming device, a hardware performs operations to image data. An image memory handler performs allocation of a memory to software execution entities which execute the operations, and performs execution control of the software execution entities. A processing part manages as queues operation specifications to respective functions of the hardware demanded from the software execution entities, and performs execution control of the operation specifications independently of the image memory handler.

16 Claims, 10 Drawing Sheets

FIG.10

```
<<TASK>>
/* CODEC DISK SET IS CREATED */
    uv_descset_create(&dset, 15);
    dset->command = <COMMAND>;
    dset->iwidth=1024;
    .....
/* DISK SET IS REGISTERED */
    uv_descset_end(dset);
/* CALLBACK IS REGISTERED */
    uv_init_callback( callback );

/* VIDEO OUTPUT DEVICE DISK SET IS CREATED
(LINKED TO OUTPUT OF CODEC BY ON-THE-FLY LINKAGE IN A HARDWARE-LIKE MANNER)*/
    uv_descset_create(&dsetdummy, 15);
    dsetdummy->command = <COMMAND>;
    dsetdummy->iwidth=1024;
    .....
/* DISK SET IS REGISTERED */
    uv_descset_end(dsetdummy);
/* PARAMETER AREA (CODEC) IS ACQUIRED AND SET UP */
    uv_pt_get(pt, sizeof(struct uv_ope_cep), pt_cep);
    pt_cep->did[0] = dsetdummy; /* OUTPUT IS DUMMY BECAUSE OF LINKAGE */
    pt_cep->did[1] = dset;
    pt_cep->header.type = UV_CONN_ONTHEFLY; /* ON-THE-FLY LINKAGE SETTING */
    pt_cep->header.command = UV_OPE_ENTER; /* THIS INDICATES EXECUTION IS NOT DONE,
AND MEANS THAT LINKAGE EXISTS AFTER THIS
    pt_cep->cmd = DEC; /* DECOMPRESSION ACTION SETTING */
    pt_cep-> ....
/* OPERATION REGISTRATION */
    uv_ope_enter(pt_cep);
/* PARAMETER AREA (VIDEO OUTPUT DEVICE) IS ACQUIRED AND SET UP */
    uv_pt_get(pt, sizeof(struct uv_ope_vout), pt_vout);
    pt_vout->did[0] = dsetdummy; /* INPUT IS DUMMY BECAUSE OF LINKAGE */
    pt_vout->header.command = UV_UPPER_GO; /* THIS INDICATES EXECUTION,
AND MEANS THAT LINKAGE EXISTS BEFORE THIS */
    pt_vout->....
/* OPERATION REGISTRATION */
    uv_ope_enter(pt_vout);

/* CALLBACK WAITING */
    /* WAITING FOR A RESULT OF EXECUTION FROM CODEC AND VIDEO OUTPUT DEVICE BY CALLBACK */

END OF TASK
```

IMAGE FORMING DEVICE, HARDWARE CONTROL METHOD, AND HARDWARE CONTROL PROGRAM

BACKGROUND OF THE INVENTION

1. Field of the Invention

The present invention relates to an image forming device, a hardware control method, and a hardware control program in which drivers of the hardware which perform operations to image data are united and the efficiency of control of the hardware is increased.

2. Description of the Related Art

Copiers, printers, etc. are represented as an image forming device, and the image forming device has functions of performing operations to image data, such as input/output of image data, image compression/decompression, image rotation, and image editing, by using the DMA (Direct Memory Access).

Generally, the functions mentioned above are offered by the hardware mounted in the ASIC (Application Specific Integrated Circuit) or the like. The drivers which control such hardware are provided on the OS (Operating System) side.

FIG. 1 shows a driver control in a conventional image forming device. As shown in FIG. 1, an image memory handler (IMH) 23 in the conventional image forming device controls the allocation of memory to processes (software execution entities) performed on the image forming device, and controls the memory allocated to the processes. In IMH 23, the plurality of task threads #1-#N control the plurality of single-function drivers required for respective operations under control of a task-control thread, so that a desired operation is realized. In each of the drivers, a descriptor which indicates the position on the memory of the image data to be processed is secured, and this descriptor is used when the image data is processed.

As described above, in the conventional image forming device, the image memory handler (IMH) 23 must control all the currently used drivers from the start of operation to the end of operation. When there are a small number of drivers, this does not become a problem. However, in recent years, the number of the drivers which must be controlled has increased with advanced features of the image forming device, and the problem arises in that the image memory handler 23 will become in an overloaded state.

Especially, the task-control thread in the image memory handler 23 must perform the scheduling to determine which of the task threads should use any of the drivers, as well as the timing control between the task threads in order to ensure an operation linkage of some of the drivers. For this reason, if IMH 23 becomes in an overloaded state, there may be a case in which the timings of the respective processings are inconsistent with each other, and the problem arises in that the image forming device does not operate normally in such a case.

For example, when a continuous printing is performed, there is the time constraint that a request must be sent within a predetermined period of time between two of the copy sheets to be printed. It becomes impossible to send the request within the predetermined period of time if the image memory handler 23 is in the overloaded state, and the continuous printing can be performed normally.

SUMMARY OF THE INVENTION

An object of the present invention is to provide an improved image forming device in which the above-described problems are eliminated.

Another object of the present invention is to provide an image forming device, a hardware control method and a hardware control program which can increase the efficiency of control of the hardware for performing operations to image data.

In order to achieve the above-mentioned objects, the present invention provides an image forming device image forming device comprising: a hardware performing operations to image data; an image memory handler performing allocation of a memory to software execution entities which execute the operations, and performing execution control of the software execution entities; and a processing part managing as queues operation specifications to respective functions of the hardware demanded from the software execution entities, and performing execution control of the operation specifications independently of the image memory handler.

The above-mentioned image forming device may be configured so that the processing part is provided to execute an operation specification at a head part of one of the queues, and delete the operation specification which execution is completed from the head part of the one of the queues.

The above-mentioned image forming device may be configured so that the processing part is provided to enable an operation linkage setup between operation specifications of the queues corresponding to the functions of the hardware to be specified, and the processing part performing the execution control according to the operation linkage setup specified.

The above-mentioned image forming device may be configured so that the processing part is provided to return a response corresponding to a command given from one of the software execution entities, to the software execution entity concerned.

The above-mentioned image forming device may be configured so that the processing part comprises a common descriptor pool retaining a plurality of descriptors which are used in common as a descriptor which indicates a position of the image data being processed in the memory.

The above-mentioned image forming device may be configured so that the processing part is provided with a virtual driver corresponding to a function which is not mounted as the hardware.

The above-mentioned image forming device may be configured so that the virtual driver serves as a video input device.

The above-mentioned image forming device may be configured so that the processing part comprises: a united driver library providing functions called from task threads which perform the operations to the image data, and returning a response corresponding to a command given from one of the task threads, to the task thread concerned; and a united driver controlling operation specifications to device units corresponding to the respective functions of the hardware as queues, and performing the execution control of the operation specifications.

The above-mentioned image forming device may be configured so that the united driver library comprises a dispatcher which associates a command given from one of the task threads with a response returned to the task thread concerned, and manages the command and the response associated.

The above-mentioned image forming device may be configured so that the united driver comprises a first minor driver provided only for data writing and a second minor driver provided only for data reading.

Moreover, in order to achieve the above-mentioned objects, the present invention provides a hardware control method for use in an image forming device comprising a hardware performing operations to image data, and an image memory handler performing allocation of a memory to software execution entities which execute the operations, and performing execution control of the software execution entities, the hardware control method comprising: managing as queues operation specifications to respective functions of the hardware demanded from the software execution entities; and performing execution control of the operation specifications independently of the image memory handler.

Moreover, in order to achieve the above-mentioned objects, the present invention provides a computer program product embodied therein for causing a computer to execute a hardware control method for use in an image forming device comprising a hardware performing operations to image data, and an image memory handler performing allocation of a memory to software execution entities which execute the operations, and performing execution control of the software execution entities, the hardware control method comprising: managing as queues operation specifications to respective functions of the hardware demanded from the software execution entities; and performing execution control of the operation specifications independently of the image memory handler.

In the image forming device of the present invention, there are provided the hardware performing operations to image data, the image memory handler performing allocation of the memory to the software execution entities which execute the operations and performing execution control of the software execution entities; and the processing part managing as queues operation specifications to respective functions of the hardware demanded from the software execution entities, and performing execution control of the operation specifications independently of the image memory handler. Accordingly, the processing burden of the high-rank order software is eased and the efficiency of the hardware control can be increased.

BRIEF DESCRIPTION OF THE DRAWINGS

Other objects, features and advantages of the present invention will be apparent from the following detailed description when reading in conjunction with the accompanying drawings.

FIG. 10 is a diagram showing an example of the processing in a linkage task.

DETAILED DESCRIPTION OF PREFERRED EMBODIMENTS

A description will now be given of an embodiment of the invention with reference to the accompanying drawings.

Figure 1:
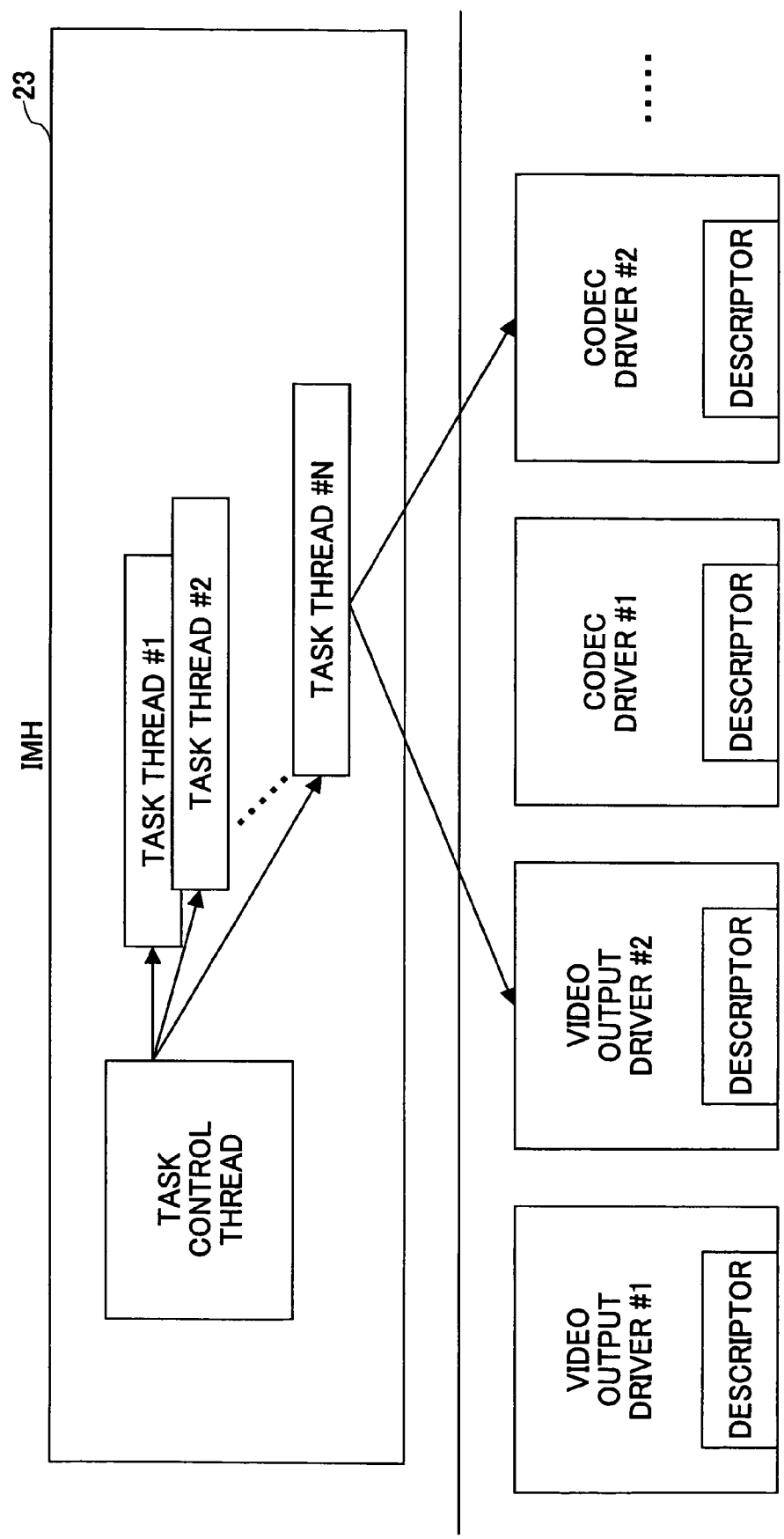
FIG. 1 is a diagram for explaining a driver control in a conventional image forming device.
Figure 2:
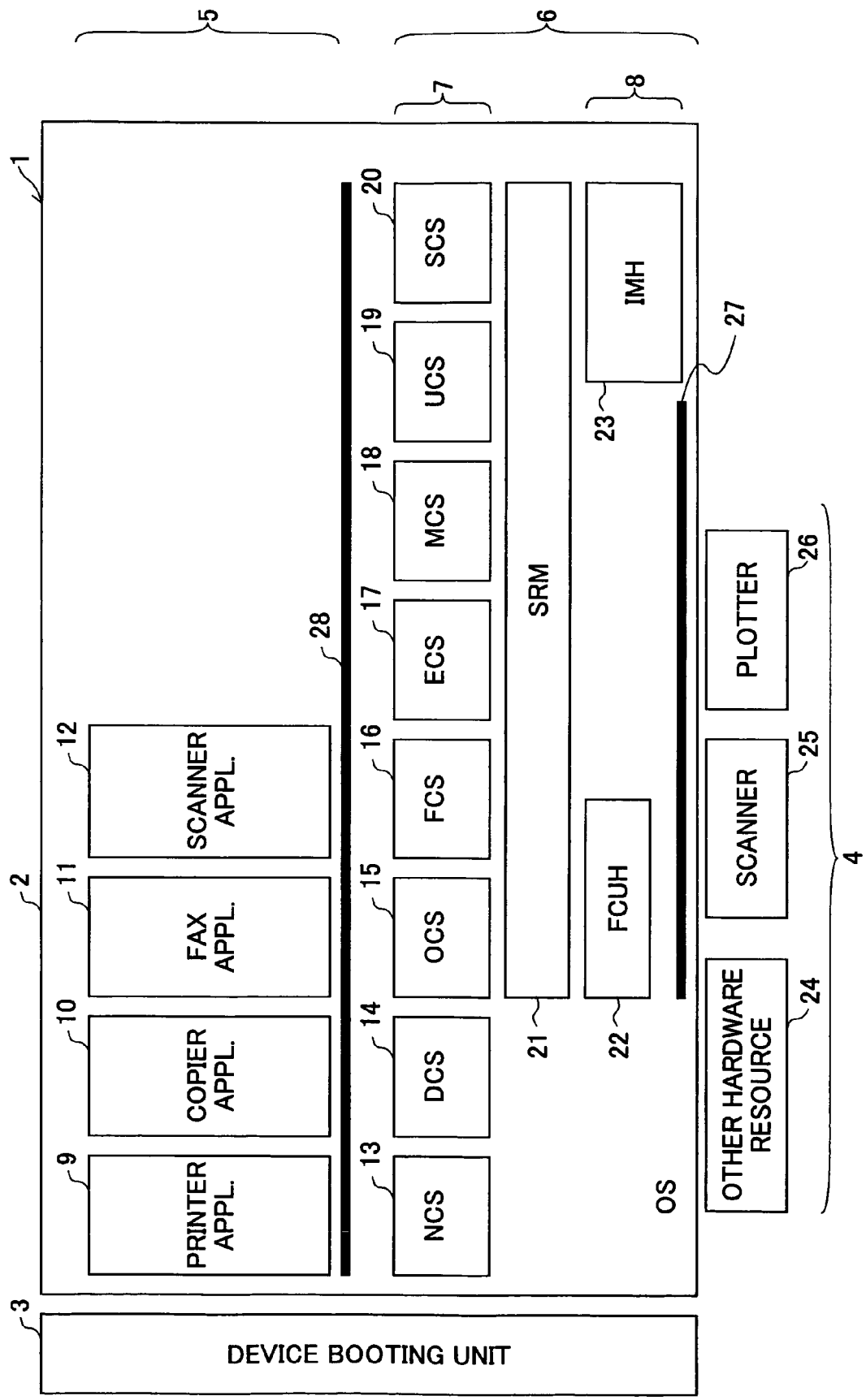
FIG. 2 is a block diagram showing the composition of an image forming device in an embodiment of the invention.

FIG. 2 shows the composition of an image forming device in an embodiment of the invention.

As shown in FIG. 2, the image forming device 1 comprises software group 2, device booting unit 3, and hardware resources 4. The device booting unit 3 is first activated upon power up of the image forming device 1, and this device booting unit 3 starts operation of application layer 5 and platform layer 6.

For example, the device booting unit 3 reads the programs of application layer 5 and platform layer 6 from a hard disk drive unit (HDD) or the like, transfers each read program to the memory area, and starts execution of the program.

The hardware resources 4 include scanner 25, plotter 26, and other hardware resource 24, such as ADF (Auto Document Feeder). The software group 2 includes the application layer 5 and the platform layer 6 which operate on operating system (OS), such as UNIX (registered trademark).

The application layer 5 includes the programs which perform processings respectively specific to the user services related to image formation of a printer, a copier, a fax, a scanner, etc.

Specifically, the application layer 5 comprises printer application 9 which is an application program for printing, copier application 10 which is an application program for copying, fax application 11 which is an application program for facsimile, and scanner application 12 which is an application program for scanning.

The platform layer 6 is provided with the following: control service layer 7 which interprets the processing demand from application layer 5, and creates the acquisition request to hardware resources 4; system resource manager (SRM) 21 which manages one or more hardware resources 4 and arbitrates the acquisition request from control service layer 7; and handler layer 8 which manages hardware resources 4 according to the acquisition request from SRM 21.

The control service layer 7 is constituted to have one or more control service modules which include: network control service (NCS) 13, delivery control service (DCS) 14, operation panel control service (OCS) 15, facsimile control service (FCS) 16, engine control service (ECS) 17, memory control service (MCS) 18; user information control service (UCS) 19, and system control service (SCS) 20.

The platform layer 6 is constituted to have API 28 which enables the receiving of the processing demand from the application layer 5 using the pre-defined function. The OS carries out parallel execution of each of the software programs of application layer 5 and platform layer 6 as the process.

The process of NCS 13 is performed to provide the service which can be used in common to the application programs which need the network I/O. The process of NCS 13 allocates the data received from the network side in accordance with each protocol to the application programs, and performs the transfer processing when transmitting the data from each application to the network side. For example, NCS 13 controls the data communication with the network device connected via the network in accordance with HTTP (hypertext transfer protocol) by using httpd (hypertext transfer protocol daemon).

The process of DCS 14 controls the distribution of a stored document. The process of OCS 15 controls the operation panel used as the information transmission means between the operator and the device main part. The process of FCS 16 provides the API for performing the facsimile transmission and reception which uses the PSTN or the ISDN network by the application layer 5, the registration/retrieval of various facsimile data managed by the backup memory, the facsimile reading, the facsimile reception printing, etc.

The process of ECS 17 controls the engine parts, such as scanner 25, plotter 26, and other hardware resource 24. The process of MCS 18 performs the memory control, such as the acquisition and releasing of the memory, and the use of HDD. UCS 19 manages the user information.

The process of SCS 20 performs the application controlling, the operation panel controlling, the system screen displaying, the LED indication, the hardware-resources management, the interruption application controlling, etc.

The process of SRM 21 performs the system controlling and the management of the hardware resources 4 in association with SCS 20. For example, the process of SRM 21 performs the arbitration and the execution control in accordance with the acquisition request sent from the high-rank layer using the hardware resources 4, such as scanner 25 and plotter 26.

Specifically, the process of SRM 21 determines whether the hardware resources 4 to which the acquisition request is sent can be used (or whether they are already used by the other acquisition requests). If they can be used, it is notified to the high-rank layer that the hardware resources 4 to which the acquisition request is sent can be used.

The process of SRM 21 performs the scheduling for exploiting hardware resources 4 to the acquisition request from the high-rank layer, and performs the demanded operation (for example, sheet transforming by the printer engine, imaging operation, memory reservation, file creation, etc.) directly.

The handler layer 8 includes the facsimile control unit handler (FCUH) 22 which manages the facsimile control unit (FCU), and the image memory handler (IMH) 23 which manages the allocation of the image memory to processes and arbitrates the accessing the memory allocated to the processes.

SRM 21 and FCUH 22 perform the transmission of the processing demand to the hardware resources 4 by using the engine I/F 27 which enables the transmission of the processing demand to the hardware resources 4 using the pre-defined function.

Thus, the image forming device 1 can perform the processing in the platform layer 6 which is needed in common by the application programs in an intensive manner.

Figure 3:
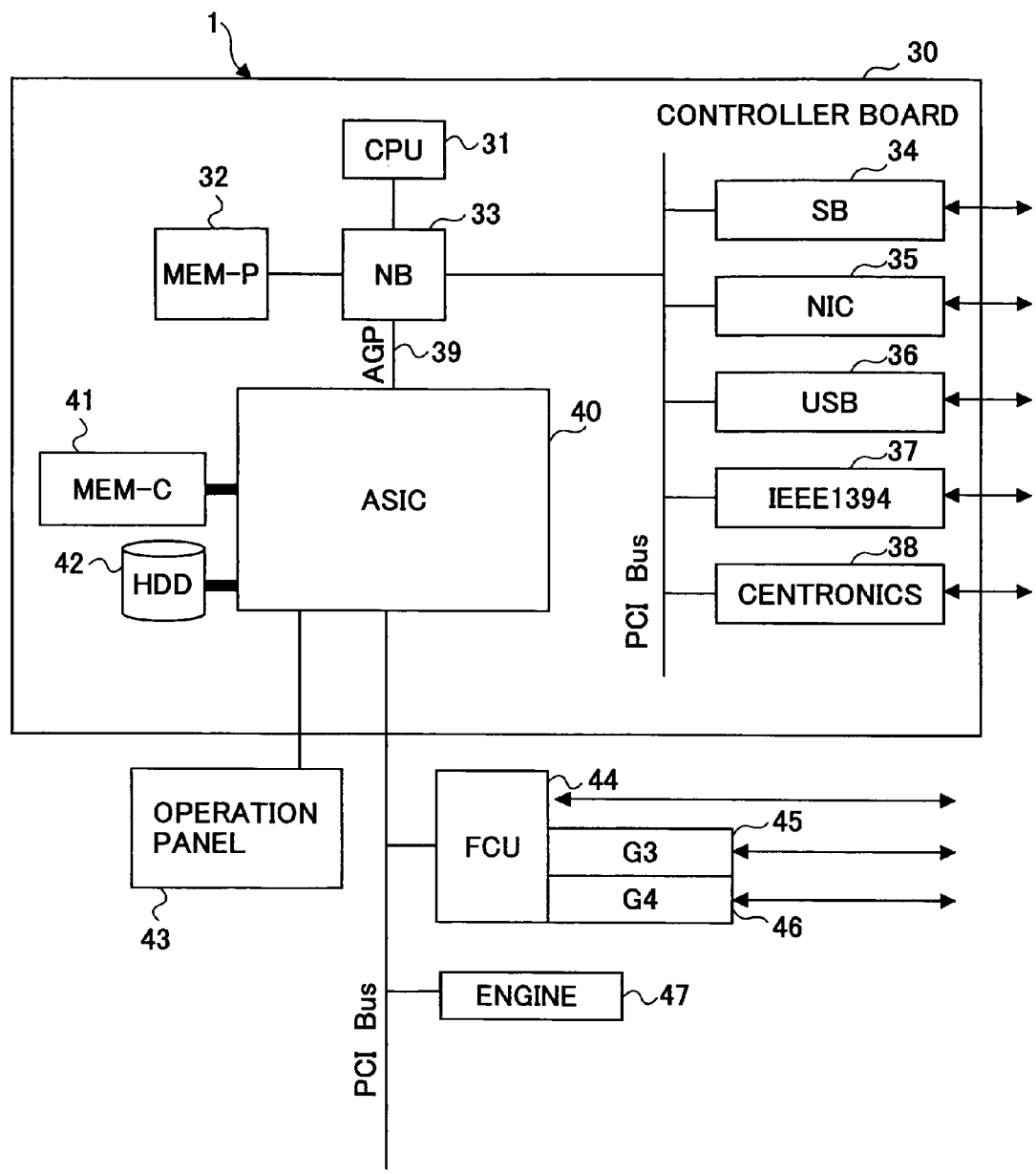
FIG. 3 is a block diagram showing the hardware composition of an image forming device in an embodiment of the invention.

Next, the hardware composition of the image forming device 1 will be explained. FIG. 3 shows the hardware composition of an image forming device in an embodiment of the invention.

As shown in FIG. 3, the image forming device 1 comprises controller board 30, operation panel 43, FCU 44, and engine 47. FCU 44 comprises the G3 fax interface unit 45, and the G4 fax interface unit 46.

The controller board 30 is provided with the following: CPU 31, ASIC 40, HDD 42, system memory (MEM-P) 32, local memory (MEM-C) 41, north bridge (NB) 33, south bridge (SB) 34, NIC (Network Interface Card) 35, USB device 36, IEEE1394 device 37, and Centronics device 38.

The operation panel 43 is connected to ASIC 40 of controller board 30. SB 34, NIC 35, USB device 36, IEEE1394 device 37, and Centronics device 38 are connected to NB 33 by the PCI bus. FCU 44 and engine 47 are connected to ASIC 40 of controller board 30 by the PCI bus.

MEM-C 41, HDD 42, etc. are connected to ASIC 40, and CPU 31 and ASIC 40 are connected to the controller board 30 via NB 33 of the CPU chip set.

Since CPU 31 and ASIC 40 are connected through NB 33, even if the interface of CPU 31 is not published to the public, it is possible to take the countermeasure.

ASIC 40 and NB 33 are connected through AGP (Accelerated Graphics Port) 39, not through the PCI bus. In order to perform the execution control of one or more processes which are provided to form application layer 5 and platform layer 6 of FIG. 2, ASIC 40 and NB 33 are connected through AGP 39 (not through the low-speed PCI bus), and it is possible to prevent the performance from deteriorating.

CPU 31 controls the entire image forming device 1. CPU 31 starts and executes any of NCS 13, DCS 14, OCS 15, FCS 16, ECS 17, MCS 18, UCS 19, SCS 20, SRM 21, FCUH 22, and IMH 23, shown in FIG. 2, on the OS as the processes respectively. And CPU 31 starts and executes any of the printer application 9, the copier application 10, the facsimile application 11, and the scanner application 12, which are provided to constitute the application layer 5.

NB 33 is a bridge which is provided for connecting CPU 31, MEM-P 32, SB 34, and ASIC 40. MEM-P 32 is a memory which is used as the drawing memory for the image forming device 1. SB 34 is a bridge which is provided for connecting NB 33 and the PCI bus with the peripheral device. MEM-C 41 is a memory which is used as the image buffer for copying or as the code buffer.

ASIC 40 is an IC which is provided for image-processing uses and has the hardware element for image processing. HDD 42 is a storage which is provided for performing accumulation of images, accumulation of programs, accumulation of font data, accumulation of form, etc. The operation panel 43 is an input/output operation unit which is provided for receiving the input operation from the user, and for outputting the display message to the user.

Figure 4:
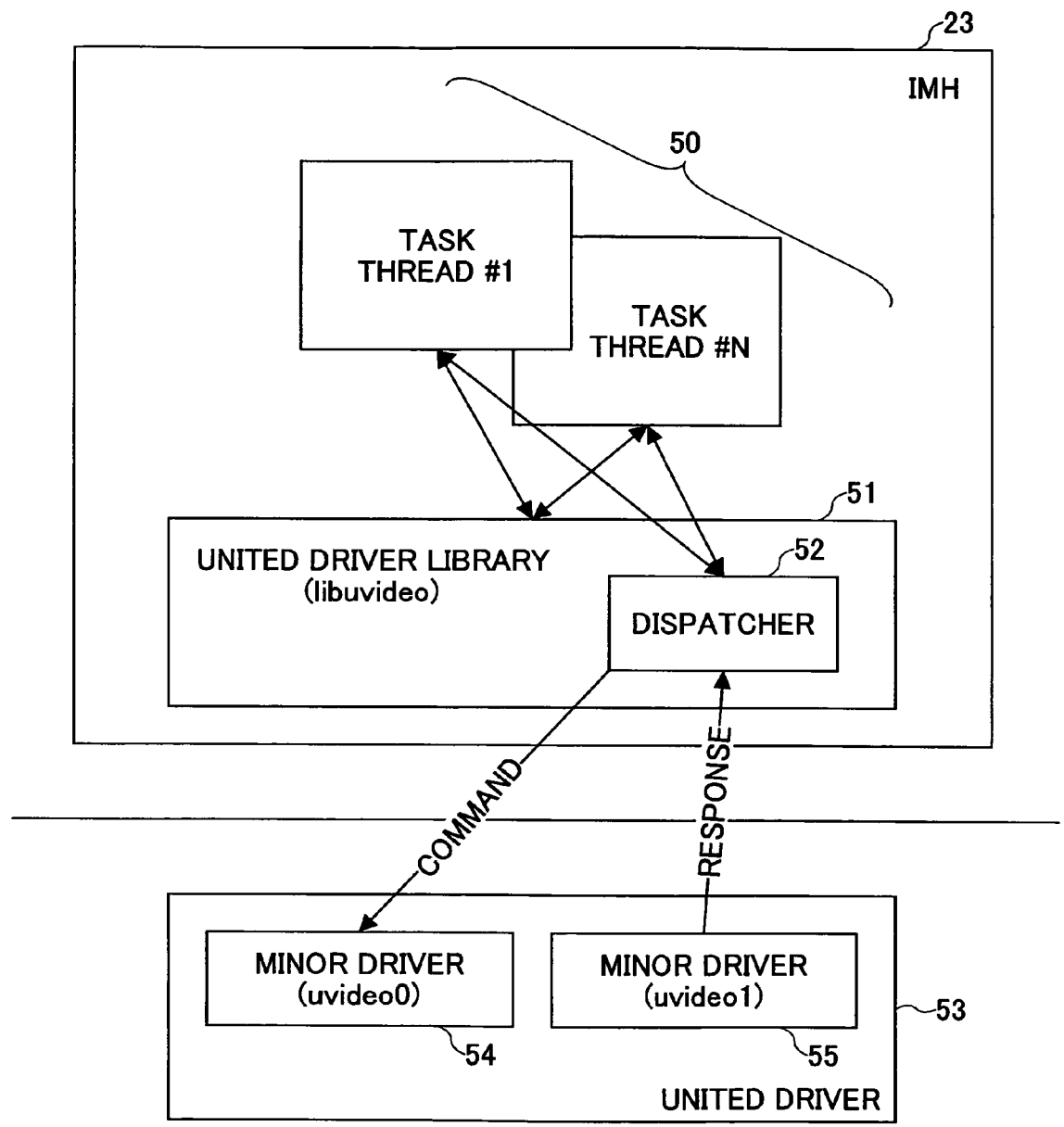
FIG. 4 is a diagram showing the composition of a united driver library and a united driver for the hardware control.

Next, the composition for controlling the hardware which performs operations to image data, which is the principal part of the invention, will be explained. FIG. 4 shows the composition of a united driver library and a united driver for the hardware control.

As shown in FIG. 4, the image memory handler (IMH) 23 controls the allocation of the memory to various processes (software execution entities) performed on the image forming device, and controls the memory allocated to the processes. In this IMH 23, a united driver library 51 is provided. The united driver library 51 provides the function (which is a function-form interface, not a system call) called from the plurality of task threads #1-#N 50 which are software execution entities, and called from the originating task which creates these task threads 50. And the united driver library 51 returns the response corresponding to the command given from any of the task threads 50, to the task thread 50 concerned.

In the united driver library 51, a dispatcher 52 is provided, and this dispatcher 52 associates a command given from one of the task threads 50 with a response returned to the task thread 50 concerned, and manages the command and the response associated.

As shown in FIG. 4, a united driver 53 is provided on the OS (Operating System) side,.and this united driver 53 manages as a queue the operation specification to each of respective functions of the hardware which is mounted on ASIC 40

(FIG. 3) to perform operations to image data, and performs the execution control of the operation specifications independently of the image memory handler 23.

In the united driver 53, a minor driver 54 which is provided only for data writing and a minor driver 55 which is provided only for data reading are provided so that the interfaces are collected in these units, in order to ensure the simultaneous execution of data writing and data reading.

Figure 5:
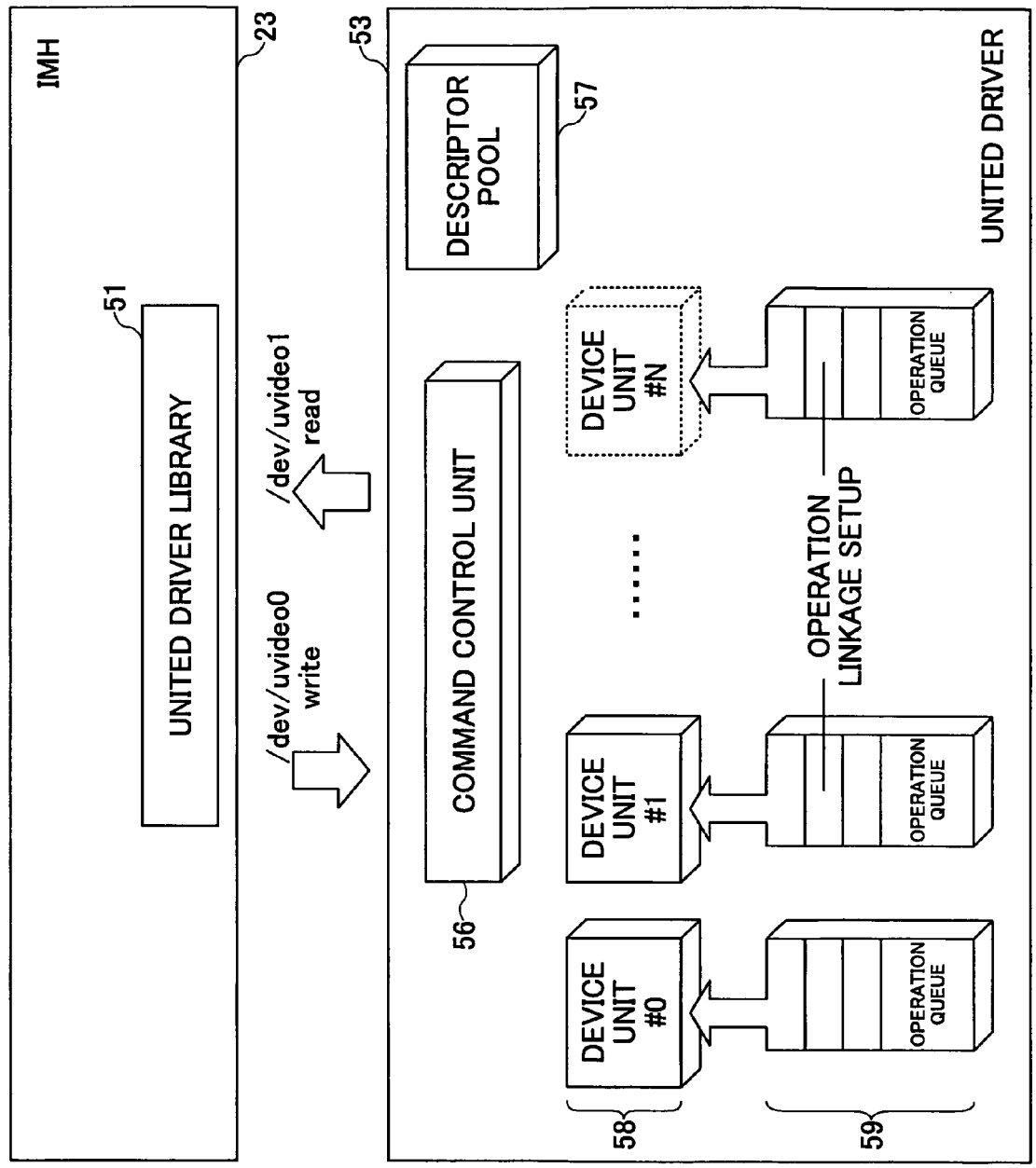
FIG. 5 is a block diagram showing the composition of a united driver.

FIG. 5 shows the composition of the united driver 53. As shown in FIG. 5, the united driver 53 comprises a command control unit 56, a common descriptor pool 57, a plurality of device units #1-#N 58, and a plurality of operation queues 59. The command control part 56 takes the interface with the united driver library 51 of IMH 23, and performs allocation of commands. The common descriptor pool 57 retains the plurality of descriptors which are used in common as a descriptor which indicates the position of the image data being processed in the memory.

The plurality of device units 58 are provided corresponding to the individual functions of the hardware. The plurality of operation queues 59 are provided corresponding to the plurality of device units 58, and the operation specifications to the device units 58 are accumulated as the operation queues 59 and they are managed.

Each device unit 58 executes the operation specification at the head part of the operation queue 59, and deletes the operation specification which execution is completed from the head part of the operation queue 59.

In the united driver 53, an operation linkage setup between the arbitrary operation specifications of the plurality of operation queues 59 corresponding to the individual functions of the hardware can be specified in order to ensure the simultaneous execution of the operation specifications. This operation linkage setup is registered in the queue entry.

Figure 6:
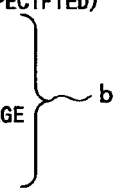
FIG. 6 is a diagram showing an example of the data structure of an operation.

FIG. 6 shows an example of the data structure of an operation. In FIG. 6, the operation of a video decoding device is illustrated as the example.

In the command "header.command" indicated by "a" in the data structure of FIG. 6, the operation linkage of the operation specifications "UV_OPE_ENTER" and "UV_UPPER_GO" is specified. The "linkage type" is specified from among the linkage types indicated by "b".

In the linkage types indicated by "b", the on-the-fly linkage is a linkage type in which image data are passed between the devices without accessing the memory, the APCM linkage is a linkage type in which operations of a video decoding device and a video output device are performed alternately, the soft linkage is a linkage type in which the operation equivalent to the APCM linkage is performed, and the grouping is a linkage type in which grouping of two or more unrelated operations is performed.

There are various combinations of operation linkage, such as video decoding device→video output device, video decoding device→coding/decoding device→video output device, coding/decoding device→HDD (Hard Disk Drive), and HDD→coding/decoding device. Setting of the operation linkage with MLB (Media Link Board) is also possible.

Figure 7:
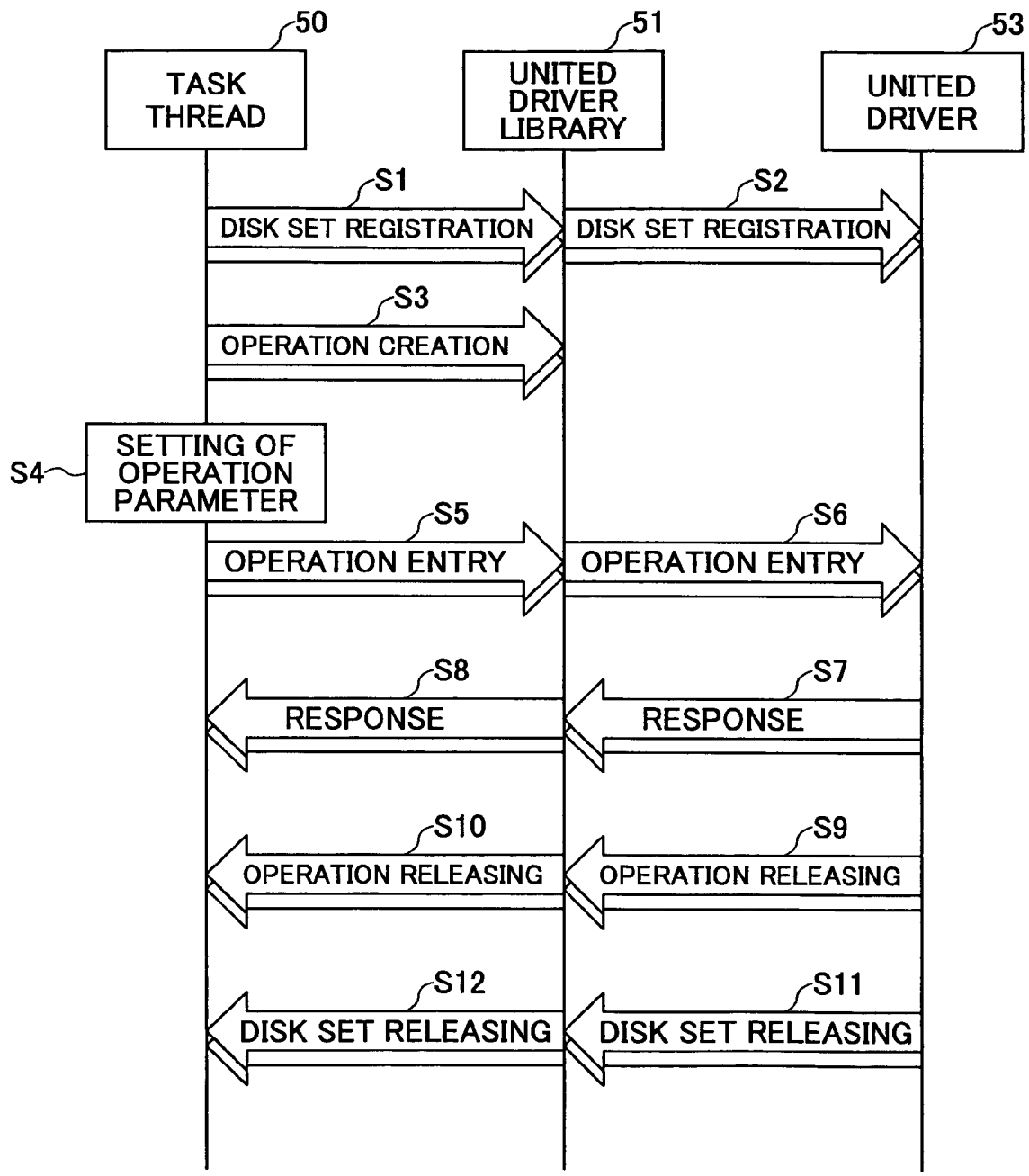
FIG. 7 is a sequence diagram for explaining the processing of the hardware control.

FIG. 7 is a sequence diagram for explaining the processing of the hardware control. As shown in FIG. 7, when the image data are processed, the task thread 50 of IMH 23 registers a disk set, which is required for the task execution and includes two or more descriptors, in the united driver library 51 (step S1). The united driver library 51 registers a similar disk set in the united driver 53 (step S2). At this time, the united driver 53 acquires a descriptor from the descriptor pool 57 (FIG. 5), and uses the descriptor as the demanded disk set.

Subsequently, the task thread 50 of IMH 23 creates an operation specification (OPE), and supplies the operation specification to the united driver library 51 (step S3).

Subsequently, the task thread 50 of IMH 23 sets up the parameters of the operation specification (step S4), and supplies the operation specification is to the united driver library 51 (step S5). The united driver library 51 supplies a similar operation specification to the united driver 53 (step S6). At this time, the united driver 53 accumulates the received operation specification as the operation queue 59 (FIG. 5).

And the united driver 53 executes the operation specification at the head part of the operation queue 59, and returns a response to the united driver library 51 (step S7). The united driver library 51 returns a similar response to the task thread 50 (step S8).

Subsequently, the united driver 53 releases the operation specification which execution is completed, and notifies to the united driver library 51 that the execution of the operation specification is completed (step S9). Similarly, the united driver library 51 notifies the releasing of the operation specification to the task thread 50 (step S10). When releasing the operation specification, the united driver 53 deletes the operation specification which execution is completed, from the head part of the operation queue 59.

Subsequently, the united driver 53 releases the disk set used in the operation specification which execution is completed, and notifies to the united driver library 51 the releasing of the disk set (step S11). The united driver library 51 notifies to the task thread 50 the releasing of the disk set similarly (step S12).

In the example of FIG. 7, the hardware control processing for one task thread 50 in the image memory handler 23 has been described. However, in a general case, the hardware control processing for each of a plurality of task threads 50 in the image memory handler 23 is performed actually.

When an operation linkage setup is specified between the operation specifications, the united driver 53 performs queuing until the execution of the operation specifications designated for the operation linkage setup becomes possible, and performs the timing control autonomously.

According to the hardware control processing of the invention, the task thread 50 of IMH 23 performs registration of disk sets, creation of operation specifications, setting of parameters, and entry of the operation specifications to the united driver library 51. This allows all the execution control including the timing control to be carried out by the autonomous operations performed by the united driver library 51 and the united driver 53. Accordingly, the image forming device according to the invention can be released from the complicated control processing as in the conventional image forming device.

According to the hardware control processing of the invention, the descriptors required for task execution are managed with the common descriptor pool 57 provided in the united driver 53, and what is necessary is just to secure the maximum amount of the descriptors that can be used in the united driver 53. It is possible to attain efficient use of the hardware resources of the image forming device.

In the conventional image forming device, the descriptors used by the driver are needed every time the driver is opened. The number of the drivers which must be controlled has increased with advanced features of the image forming device in recent years, and the consumption amount of the descriptors will become considerable. There has been a problem that the consumption of several descriptors puts a severe strain on the memory resources restricted in an incorporation type device (such as an image forming device incorporating a computer unlike a general-purpose personal computer). It is possible for the image forming device of the invention to resolve such a problem.

Unlike the conventional image forming device in which the single-function drivers corresponding to the individual functions of the hardware are provided, in the image forming device of the invention, only the united driver library 51 and the united driver 53 are provided and the driver functions can be realized without the constraint of the hardware. It is possible to form the virtual driver even if the corresponding hardware function is not mounted on the ASIC 40.

For example, when an image processing is performed, the processing which clears a vast memory area (cache flash) takes place frequently. In the image forming device provided with the hardware (video input device) which performs the input of image data, the cache flash processing can be performed with the hardware processing through the driver in which "0" data are written to the memory continuously.

However, there is also an image forming device having no video input device mounted thereon. In the conventional image forming device, and the cache flash processing must be performed on the side of the processes, and there has been a problem that the processing burden on the side of the processes is large. According to the image forming device of the invention, a virtual driver which serves as the video input device can be formed, and the cache flash processing can be performed through the united driver library 51 and the united driver 53 without putting a large burden on the side of processes.

Figure 8:
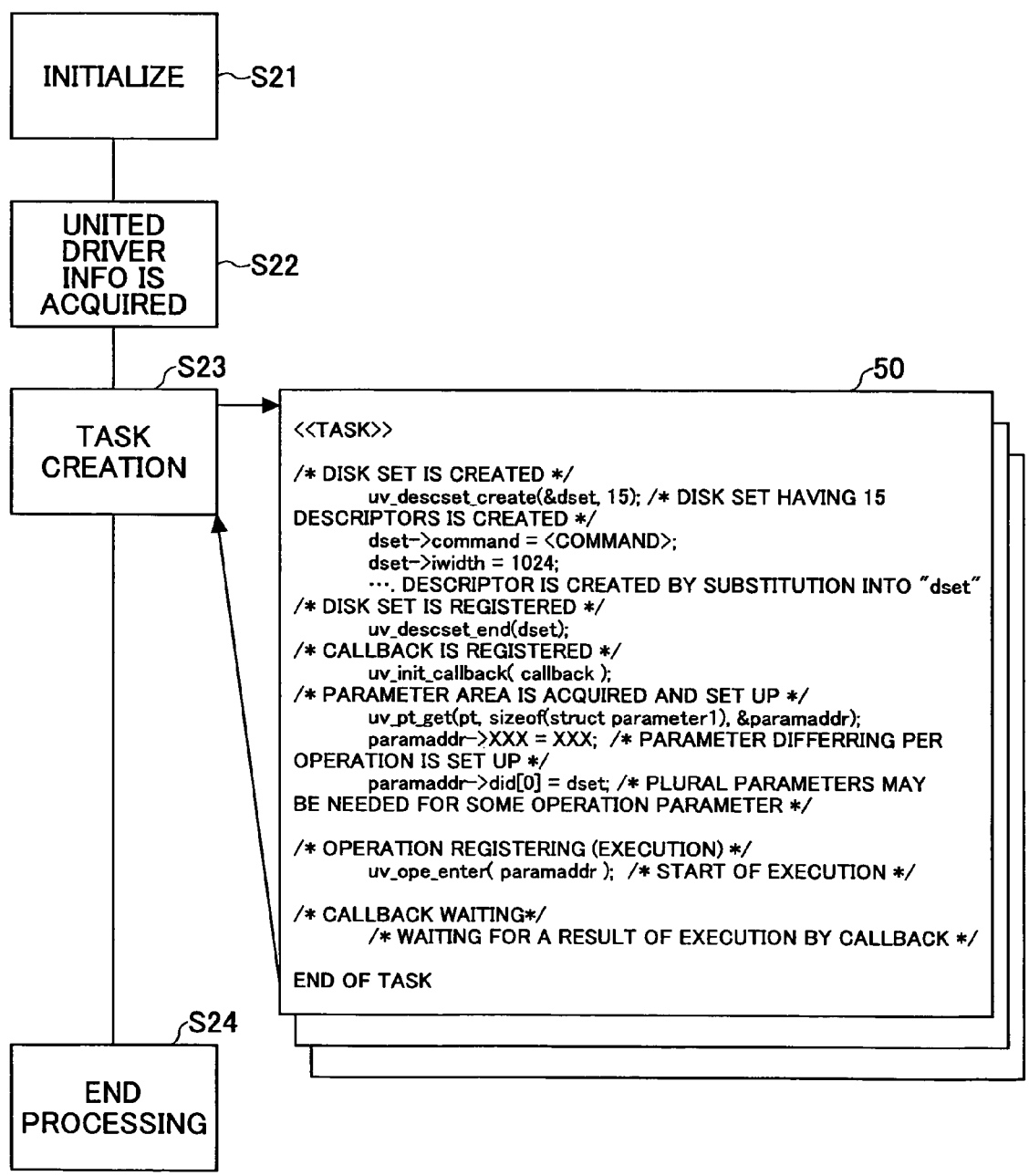
FIG. 8 is a flowchart for explaining the processing which calls the united driver library from the image memory handler.

Next, FIG. 8 is a flowchart for explaining the processing which calls the united driver library from the image memory handler.

As shown in FIG. 8, IMH 23 performs initialization of the united driver library 51 and the united driver 53, in order to make the use of various services possible (step S21). In this initialization, several initialization functions which are provided by the united driver library 51 are called.

Subsequently, IMH 23 acquires the united driver information concerning the device units 58 which can be used in the united driver 53 (step S22). In this information acquisition, the information get function which is provided by the united driver library 51 is called.

Subsequently, IMH 23 creates two or more task threads 50 according to the contents of the processing (step S23), and, in each task thread 50, creation of disk sets, registration of disk sets, registration of a call-back (response), acquisition and setting of a parameter area, operation registration and execution, and call-back waiting are performed.

After the processing of the task threads 50 is completed, IMH 23 performs the end processing, such as deletion of the parameter and releasing of the disk sets (step S24).

Figure 9:
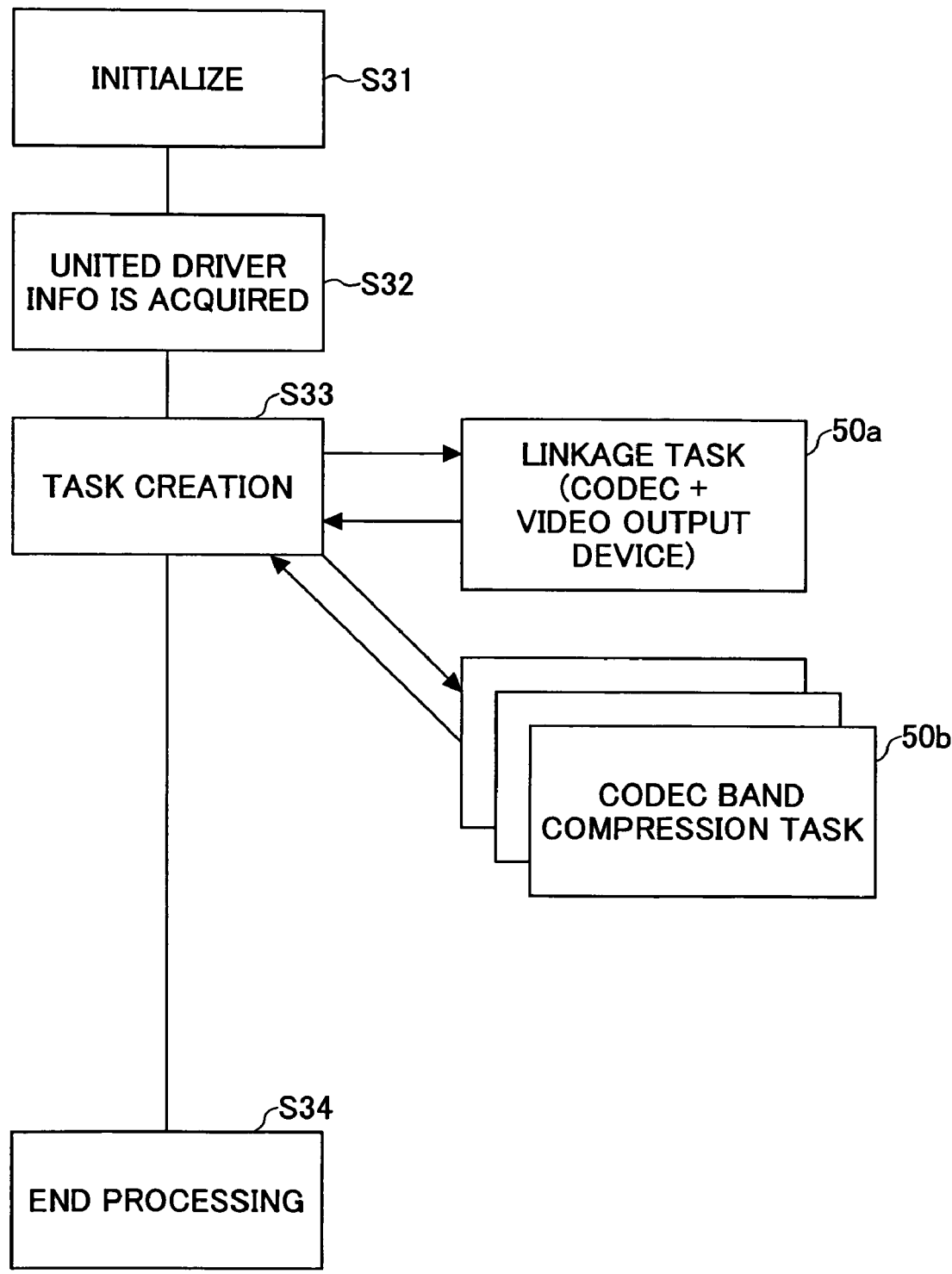
FIG. 9 is a flowchart for explaining the processing which calls the united driver library from the image memory handler.

Next, FIG. 9 is a flowchart for explaining another example of the processing which calls the united driver library from the image memory handler. In FIG. 9, the example in which an operation linkage task is created is illustrated.

The initialization step (step S31), the united driver information acquisition step (step S32), the task creation step (step S33), and the end processing (step S34) in the flowchart of FIG. 9 are essentially the same as those corresponding steps in the flowchart of FIG. 8.

However, in the task creation step (step S33) of FIG. 9, a linkage task 50a of a coding/decoding device (codec) and a video output device is created independently from a codec (coding/decoding device) band compression task 50b.

The coding/decoding device performs compression and decompression of image data, and the video output device outputs image data (imaging data for printing). Since it is necessary to perform the video output operation in synchronization with the time of completion of the decompression of the image data, operation linkage is needed.

FIG. 10 shows an example of the processing in the linkage task 50a. In the processing of FIG. 10, creation of disk sets concerning the codec (coding/decoding device), registration of the disk sets, registration of a call-back, creation of disk sets concerning the video output device, registration of the disk sets, acquisition and setting of a parameter area concerning the codec (coding/decoding device), operation registration, acquisition and setting of a parameter area concerning the video output device, operation registration, and call-back waiting are performed.

Setting of an operation linkage is performed in performing the acquisition and setting of the parameter area. And, if the entry of the operation specification of the video output device takes place after the entry of the operation specification to the coding/decoding device in which the operation linkage is specified, then it is considered that both the operation specifications are designated for the operation linkage.

In the codec band compression task 50b, the band (which is the unit of the memory area) used for compression and decompression of image data is compressed.

The present invention is not limited to the above-described embodiments, and variations and modifications may be made without departing from the scope of the present invention.

Further, the present application is based on and claims the benefit of priority of Japanese patent application No. 2004-282049, filed on Sep. 28, 2004, and Japanese patent application No. 2005-259433, filed on Sep. 7, 2005, the entire contents of which are hereby incorporated by reference.

What is claimed is:

1. An image forming device comprising:
   hardware performing operations to image data in an image memory;
   an image memory handler allocating the image memory to task threads and managing execution of the operations to the image data by the hardware; and
   a processing part managing as queues operation specifications to respective functions of the hardware demanded from the task threads, and managing execution of the operations to the image data by the hardware of the image memory handler,
   the processing part comprising:
   a common descriptor pool retaining a plurality of descriptors each of which issued in common as a descriptor that indicates a position of the image data being processed in the image memory;
   a united driver library providing functions called from the task threads, and returning a response corresponding to a command given from one of the task threads, to the task thread concerned; and
   a united driver managing operation specifications to device units corresponding to the respective functions of the hardware as queues, and managing execution of the operations to the image data by the hardware in accordance with the operation specification to the device units.

2. The image forming device according to claim 1 wherein the processing part is provided to execute an operation specification at a head part of one of the queues, and delete the operation specification which execution is completed from the head part of the one of the queues.

3. The image forming device according to claim 1 wherein the processing part is provided to enable an operation linkage setup between operation specifications of the queues corresponding to the functions of the hardware to be specified, and the processing part performing the execution control according to the operation linkage setup specified.

4. The image forming device according to claim 1 wherein the processing part is provided to return a response corresponding to a command given from one of the task threads, to the task thread concerned.

5. The image forming device according to claim 1 wherein the processing part is provided with a virtual driver corresponding to a function which is not mounted as the hardware.

6. The image forming device according to claim 5 wherein the virtual driver serves as a video input device.

7. The image forming device according to claim 1 wherein the united driver library comprises a dispatcher which associates a command given from one of the task threads with a response returned to the task thread concerned, and manages the command and the response associated.

8. The image forming device according to claim 1 wherein the united driver managing operation specifications comprises a first minor driver provided only for data writing and a second minor driver provided only for data reading.

9. A hardware control method for use in an image forming device comprising hardware performing operations to image data in an image memory, and an image memory handler allocating the image memory to task threads and managing execution of the operations to the image data by the hardware, the hardware control method comprising:
    managing as queues operation specifications to respective functions of the hardware demanded from the task threads and managing execution of the operations of the operations to the image data by the hardware independently of the image memory handler;
    retaining a plurality of descriptors each of which is used in common as a descriptor that indicates a position of the image data being processed in the image memory;
    providing functions called from the task threads, and returning a response corresponding to a command given from one of the task threads, to the task thread concerned;
    managing operation specifications to device units corresponding to the respective functions of the hardware as queues; and
    managing execution of the operations to the image data by the hardware in accordance with the operation specification to the device units.

10. The hardware control method according to claim 9 wherein an operation specification at a head part of one of the queues is executed, and the operation specification which execution is completed is deleted from the head part of the one of the queues.

11. The hardware control method according to claim 9 wherein an operation linkage setup between operation specifications of the queues corresponding to the functions of the hardware is enabled to be specified, and the execution control is performed according to the operation linkage setup specified.

12. The hardware control method according to claim 9 wherein a response corresponding to a command given from one of the task threads is returned to the task thread concerned.

13. The hardware control method according to claim 9 wherein a common descriptor pool retaining a plurality of descriptors which are used in common as a descriptor which indicates a position of the image data being processed in the memory is provided in the image forming device.

14. The hardware control method according to claim 9 wherein a virtual driver corresponding to a function which is not mounted as the hardware is provided in the image forming device.

15. The hardware control method according to claim 14 wherein the virtual driver serves as a video input device.

16. A non-transitory computer-readable medium encoded with a computer program for causing an image forming device to execute a hardware control method, the image forming device comprising hardware performing operations to image data in an image memory, and an image memory handler allocating the image memory to task threads and managing execution of the operations to the image data by the hardware, the hardware control method comprising:
    managing as queues operation specifications to respective functions of the hardware demanded from the task threads and managing execution of the operations of the operations to the image data by the hardware independently of the image memory handler;
    retaining a plurality of descriptors each of which is used in common as a descriptor that indicates a position of the image data being processed in the image memory;
    providing functions called from the task threads, and returning a response corresponding to a command given from one of the task threads, to the task thread concerned;
    managing operation specifications to device units corresponding to the respective functions of the hardware as queues; and
    managing execution of the operations to the image data by the hardware in accordance with the operation specification to the device units.

* * * * *